United States Patent
Cui et al.

(10) Patent No.: US 12,238,145 B2
(45) Date of Patent: Feb. 25, 2025

(54) SECURITY PROTECTION METHOD AND DEVICE BASED ON INDUSTRIAL INTERNET

(71) Applicant: HUANENG INFORMATION TECHNOLOGY CO., LTD., Shandong (CN)

(72) Inventors: Lei Cui, Qingdao (CN); Ziqiang Wen, Qingdao (CN); Dongliang Li, Qingdao (CN); Jiaxin Zhu, Qingdao (CN); Xiaoyu Liu, Qingdao (CN); Pengfei Xie, Qingdao (CN); Chongwu Sun, Qingdao (CN)

(73) Assignee: HUANENG INFORMATION TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/767,960

(22) Filed: Jul. 9, 2024

(65) Prior Publication Data
US 2025/0023922 A1    Jan. 16, 2025

(30) Foreign Application Priority Data

Jul. 11, 2023  (CN) .......................... 202310841363.7

(51) Int. Cl.
*H04L 9/40* (2022.01)
(52) U.S. Cl.
CPC .............. *H04L 63/205* (2013.01); *H04L 9/40* (2022.05); *H04L 63/0209* (2013.01); *H04L 63/101* (2013.01)
(58) Field of Classification Search
CPC ..... H04L 63/205; H04L 9/40; H04L 63/0209; H04L 63/101
See application file for complete search history.

(56) References Cited

U.S. PATENT DOCUMENTS 10,484,334 B1   11/2019   Lee et al.
11,442,755 B1 *  9/2022   Patimer ................. H04L 63/08
(Continued)

FOREIGN PATENT DOCUMENTS

CN        106790231 A       5/2017
CN        109508224 A       3/2019
(Continued)

OTHER PUBLICATIONS

First Office Action in Chinese Application No. 202310841363.7 mailed on Aug. 12, 2023, 20 pages.
(Continued)

*Primary Examiner* — Yonas A Bayou
(74) *Attorney, Agent, or Firm* — PORUS IP LLC (57) ABSTRACT

A security protection method and device based on industrial Internet is provided. The disclosure relates to the technical field of network security and realize the isolation between the Internet and the industrial Internet platform intranet by deploying the exit firewall, and there is no restriction from the industrial Internet platform intranet to the Internet, and only necessary ports are opened from the Internet to the industrial Internet platform intranet. By deploying a regional firewall, isolation between the intranet core server and each of the secondary nodes is realized. The regional firewall is deployed on the wide area network router, and the second access policy of secondary nodes and intranet core servers is preset. After the second access policy is formulated, only the IP and service ports of specific hosts are opened, and all other accesses are prohibited.

8 Claims, 3 Drawing Sheets

(56) References Cited

U.S. PATENT DOCUMENTS

| | | | |
|---|---|---|---|
| 11,444,925 B1* | 9/2022 | Patimer | H04L 67/147 |
| 11,457,047 B2* | 9/2022 | Chander | G06F 9/45558 |
| 2017/0048263 A1* | 2/2017 | Chen | H04L 63/1425 |
| 2018/0225135 A1* | 8/2018 | Xiao | G05B 23/0218 |
| 2019/0238511 A1* | 8/2019 | Murrell | H04L 67/141 |
| 2020/0028821 A1* | 1/2020 | Weisshaupt | H04L 63/1441 |
| 2020/0186538 A1* | 6/2020 | Koshal | H04L 61/2557 |
| 2020/0296139 A1* | 9/2020 | Fainberg | H04L 63/205 |
| 2022/0217182 A1* | 7/2022 | Yancey | H04L 63/102 |
| 2023/0020094 A1* | 1/2023 | Fainberg | H04L 63/205 |
| 2023/0283644 A1* | 9/2023 | Yancey | H04L 63/101 |
| | | | 726/1 |
| 2024/0064174 A1* | 2/2024 | Molzon | G06F 21/604 |

FOREIGN PATENT DOCUMENTS

| | | |
|---|---|---|
| CN | 110661761 A | 1/2020 |
| CN | 113079185 A | 7/2021 |
| CN | 114189355 A | 3/2022 |
| CN | 114418263 A | 4/2022 |
| CN | 114499927 A | 5/2022 |
| CN | 114819655 A | 7/2022 |
| CN | 115065548 A | 9/2022 |
| CN | 116248352 A | 6/2023 |
| CN | 116366689 A | 6/2023 |

OTHER PUBLICATIONS

Decision to Grant a Patent in Chinese Application No. 202310841363.7 mailed on Aug. 31, 2023, 7 pages.

\* cited by examiner

SECURITY PROTECTION METHOD AND DEVICE BASED ON INDUSTRIAL INTERNET

CROSS-REFERENCE TO RELATED APPLICATIONS

This application claims priority of Chinese Patent Application No. 202310841363.7, filed on Jul. 11, 2023, the contents of which is hereby incorporated by reference.

TECHNICAL FIELD

The disclosure relates to the technical field of network security, in particular to a security protection method and device based on industrial Internet.

BACKGROUND

Industrial Internet platform is an industrial cloud platform that meets the digital, networked and intelligent requirements of manufacturing industry, builds a service system based on massive data collection, aggregation and analysis, and supports ubiquitous connection, flexible supply and efficient configuration of manufacturing resources.

The connection of industrial Internet has gradually broken the relatively closed and credible production environment of traditional industries. However, the industrial Internet platform involves the connection between a large number of apparatuses, sensors and systems. The original internal network of the factory is a closed network, and there is no strict authority control and regional isolation between the original production area and various devices. After accessing the Internet, there are various potential security risks. If not effectively prevented and controlled, these risks may lead to the above-mentioned series of problems. When establishing and operating industrial Internet platform, we must attach great importance to security and take a series of measures to ensure its security. At present, the security protection measures for the industrial Internet platform are relatively simple, which cannot take into account the network use requirements and security protection capabilities of the industrial Internet platform. Therefore, it is necessary to propose a security protection method and device based on industrial Internet to solve the above problems.

SUMMARY

The purpose of the disclosure is to provide a security protection method and device based on industrial Internet, so as to solve the problem that the existing security protection measures of industrial Internet platforms can not take into account the network use requirements and security protection capabilities of industrial Internet platforms.

The disclosure provides a security protection method based on industrial Internet, which includes:
receiving a first communication request from an apparatus deployed in an exit area and an intranet core server through an exit firewall; where by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet;
judging whether the first communication request conforms to the first access policy through the exit firewall;
where if the first communication request conforms to the first access policy, the exit firewall opens corresponding IP and ports to allow communication between the apparatus deployed in the exit area and the intranet core server;
if the first communication request fails to conform to the first access policy, the exit firewall prohibits the communication between the apparatus deployed in the exit area and the intranet core server;
receiving a second communication request from secondary nodes of the industrial Internet platform intranet and the intranet core server through a regional firewall; where by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only IP and service ports of a specific host are opened, and all other accesses are prohibited;
judging whether the second communication request conforms to the second access policy through the regional firewall;
where if the second communication request conforms to the second access policy, the regional firewall opens the IP and the service ports of the specific host and allows communication between the secondary nodes and the intranet core server;
if the second communication request fails to meet the second access policy, the regional firewall prohibits the communication between the secondary nodes and the intranet core server.

Further, the method further includes: monitoring data interaction between the industrial Internet platform intranet and the Internet by an intrusion prevention system, access data of the Internet onto the industrial Internet platform intranet, where the intrusion prevention system is deployed in a network front-end core apparatus of the industrial Internet platform.

Further, the method further includes: scanning each business system and security system apparatus of the industrial Internet platform by a vulnerability scanning system, and timely finding system vulnerabilities and taking timely measures according to scanning evaluation results; where the vulnerability scanning system is deployed in a core intranet management area.

Further, the method further includes:
realizing storage access isolation between virtual machines through a virtualization layer, isolating user data;
performing authority control between a user and a virtual machine image, performing authority confirmation on mounted volume of the user, and performing access control on an object storage user object;
performing complete data erasure before storage resources being redistributed to VM, and after stored user files/objects are deleted, performing complete data erasure on a corresponding storage area or marking as write-only;
where data storage and backup adopt following policies: defining a database data storage path to a special disk array storage medium; performing data backup in a manner of combining full backup and differential backup; performing the full backup once a week and performing the differential backup of business data once a day; saving and managing backup data in different places.

Further, the method further includes: managing important servers and all security apparatuses by a security management platform server, performing analysis after logs being collected, separating alarm levels; giving an alarm in a manner of sound, light, electricity, mail or short message, and reminding an administrator in time; where the security management platform server is deployed in a management area of the industrial Internet platform intranet, protection is provided by a firewall, and external Internet users are not allowed to access the security management platform server.

In a second aspect, the disclosure provides a security protection device based on industrial Internet, including:

an exit firewall used for receiving a first communication request from an apparatus deployed in an exit area and an intranet core server, where by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet; whether the first communication request conforms to the first access policy is judged; where if the first communication request conforms to the first access policy, corresponding IP and ports are opened to allow communication between the apparatus deployed in the exit area and the intranet core server; if the first communication request fails to conform to the first access policy, the communication between the apparatus deployed in the exit area and the intranet core server is prohibited;

a regional firewall used for receiving a second communication request from secondary nodes of the industrial Internet platform intranet and the intranet core server; where by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only IP and service ports of a specific host are opened, and all other accesses are prohibited; whether the second communication request conforms to the second access policy is judged; where if the second communication request conforms to the second access policy, the IP and the service ports of the specific host are opened and communication between the secondary nodes and the intranet core server is allowed; if the second communication request fails to meet the second access policy, the communication between the secondary nodes and the intranet core server is prohibited.

Further, the device further includes: an intrusion prevention system used for monitoring data interaction between the industrial Internet platform intranet and the Internet, and access data of the Internet onto the industrial Internet platform intranet, where the intrusion prevention system is deployed in a network front-end core apparatus of the industrial Internet platform.

Further, the device further includes: a vulnerability scanning system used for scanning each business system and security system apparatus of the industrial Internet platform, and timely finding system vulnerabilities and taking timely measures according to scanning evaluation results; where the vulnerability scanning system is deployed in a core intranet management area.

Further, the device further includes:

a data security system used for realizing storage access isolation between virtual machines through a virtualization layer, and isolating user data; authority control is performed between a user and a virtual machine image, authority confirmation is performed on mounted volume of the user, and access control is performed on an object storage user object; complete data erasure is performed before storage resources being redistributed to VM, and after stored user files/objects are deleted, complete data erasure is performed on a corresponding storage area or is marked as write-only; where data storage and backup adopt following policies: a database data storage path is defined to a special disk array storage medium; data backup is performed in a manner of combining full backup and differential backup; the full backup is performed once a week and the differential backup of business data is performed once a day; backup data is saved and managed in different places.

Further, the device further includes: a security management platform server used for managing important servers and all security apparatuses, and performing analysis after logs being collected, separating alarm levels; giving an alarm in a manner of sound, light, electricity, mail or short message, and reminding an administrator in time; where the security management platform server is deployed in a management area of the industrial Internet platform intranet, protection is provided by a firewall, and external Internet users are not allowed to access the security management platform server.

The beneficial effects of the disclosure are as follows: the security protection method and device based on the industrial Internet according to the disclosure realize the isolation between the Internet and the industrial Internet platform intranet by deploying the exit firewall, and there is no restriction from the industrial Internet platform intranet to the Internet, and only necessary ports are opened from the Internet to the industrial Internet platform intranet. By deploying a regional firewall, isolation between the intranet core server and each of the secondary nodes is realized. The regional firewall is deployed on the wide area network router, and the second access policy of secondary nodes and intranet core servers is preset. After the second access policy is formulated, only the IP and service ports of specific hosts are opened, and all other accesses are prohibited. The disclosure can give consideration to the network use requirements and security protection capabilities of the industrial Internet platform, and improve the security of the industrial Internet platform.

BRIEF DESCRIPTION OF THE DRAWINGS

In order to explain the technical scheme of the disclosure more clearly, the drawings needed to be used in the embodiment will be briefly introduced below. Apparently, for those of ordinary skill in the art, other drawings can be obtained according to these drawings without creative efforts.

DETAILED DESCRIPTION OF THE EMBODIMENTS

In order to make the purpose, technical scheme and advantages of this disclosure more clear, in the following, the technical scheme of the disclosure will be clearly and completely described in combination with specific embodiments of the disclosure and corresponding drawings. Apparently, the described embodiment is only a part of the embodiment of the disclosure, not all of the embodiment. Based on the embodiments in this disclosure, all other embodiments obtained by those of ordinary skill in the art without creative efforts belong to the scope of protection in this disclosure. The technical scheme provided by each embodiment of the disclosure will be described in detail below in combination with the attached drawings.

Figure 1:
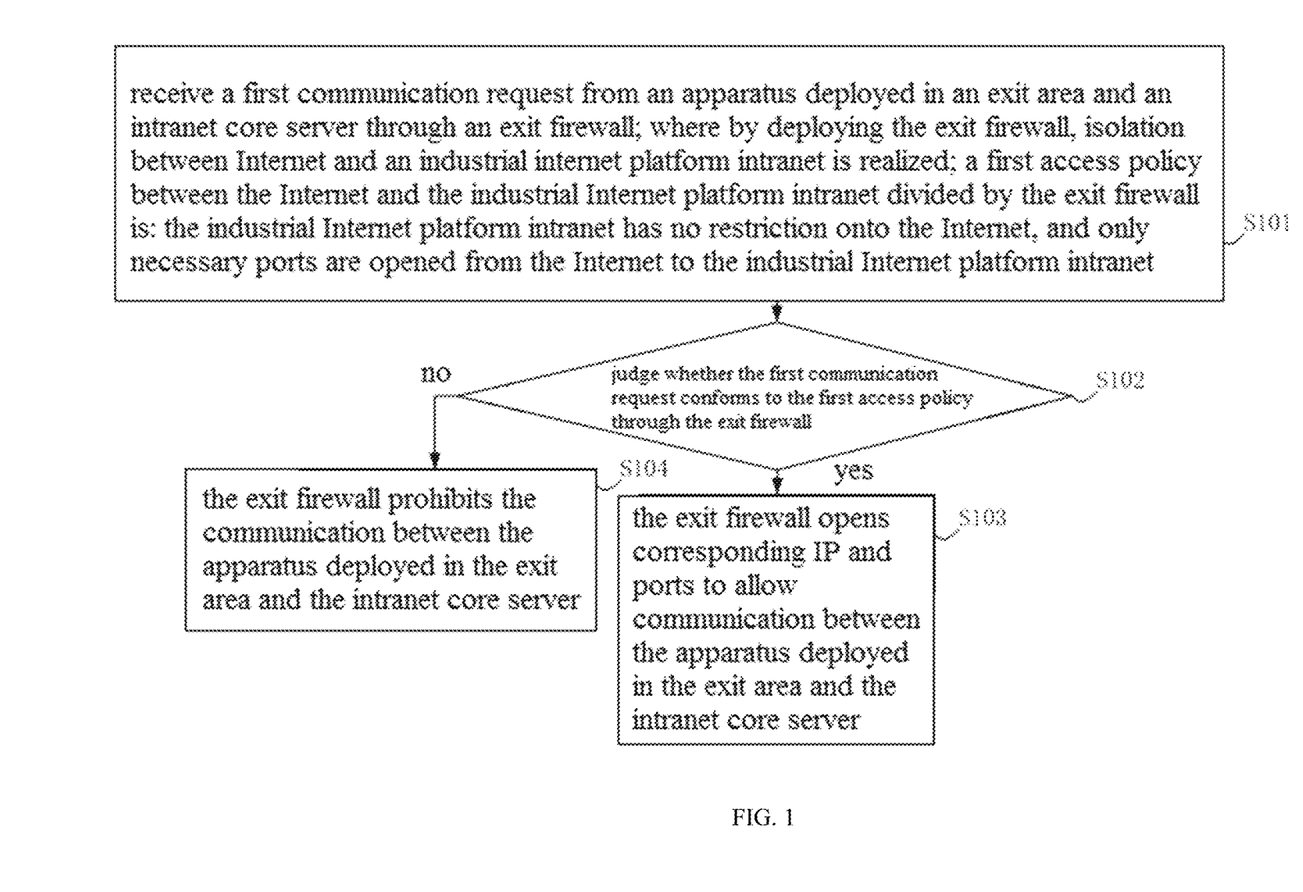
FIG. 1 is a flowchart of an embodiment of a security protection method based on industrial Internet according to the disclosure.

Referring to FIG. 1, a security protection method based on industrial Internet is provided and includes:

S101, an exit firewall receives a first communication request from an apparatus deployed in an exit area and an intranet core server; where by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet.

Specifically, two Gigabit exit firewalls can be deployed, two firewalls, one main and one standby, improve exit reliability. There is no restriction on the access to the Internet from the industrial Internet platform intranet, mainly considering the Internet access requirements of the Internet terminals in the intranet, and other apparatuses need to be upgraded to the public network, taking into account the network use requirements and security protection capabilities of the industrial Internet platform, so as to enhance the security of the industrial Internet platform.

S102, whether the first communication request conforms to the first access policy is judged through the exit firewall.

S103, if the first communication request conforms to the first access policy, the exit firewall opens corresponding IP and ports to allow communication between the apparatus deployed in the exit area and the intranet core server.

S104, if the first communication request fails to conform to the first access policy, the exit firewall prohibits the communication between the apparatus deployed in the exit area and the intranet core server.

Figure 2:
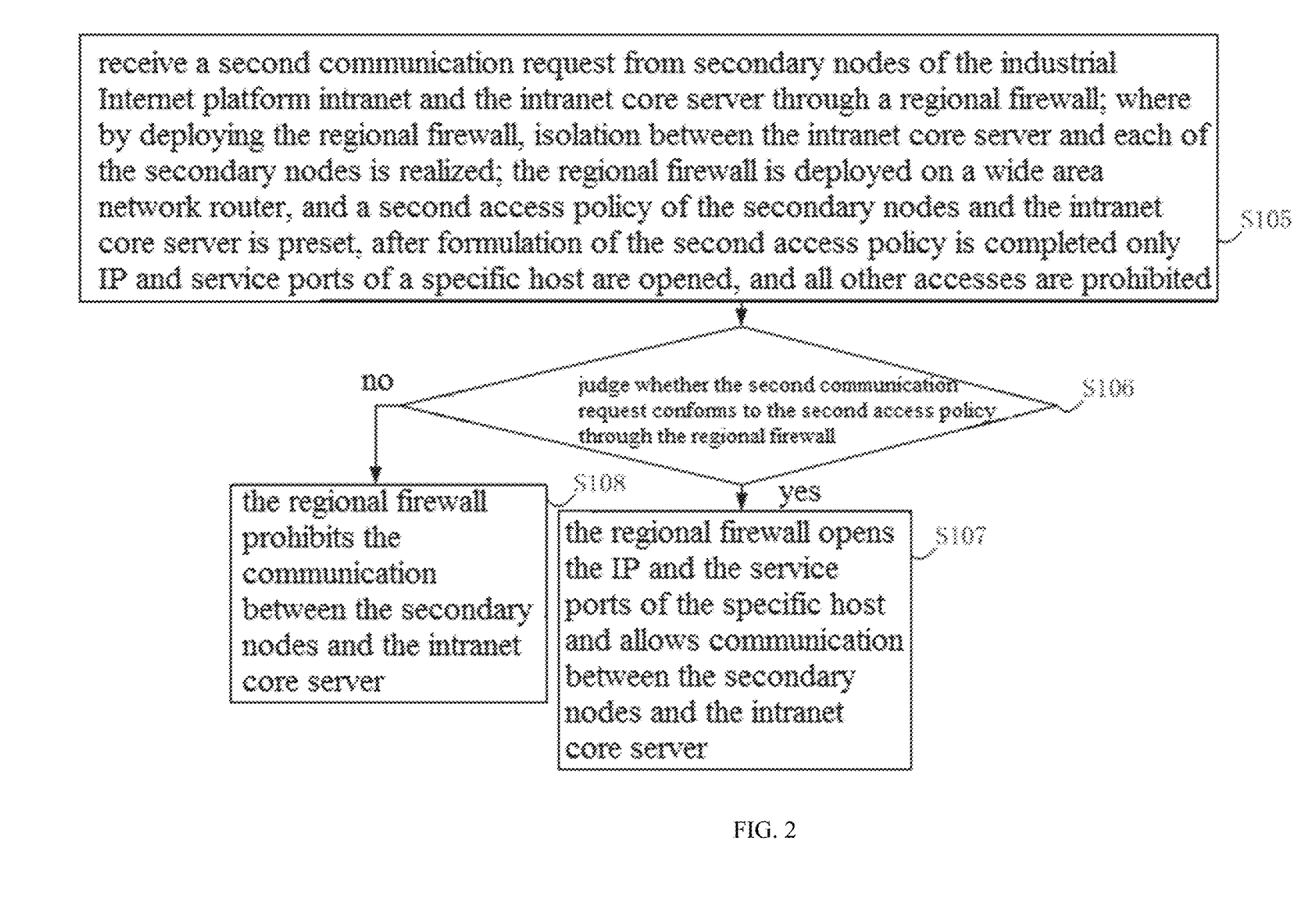
FIG. 2 is a flowchart of another embodiment of the security protection method based on industrial Internet according to the disclosure.

Please refer to FIG. 2, the disclosure also sets up a regional firewall to perform safety protection on the communication between the secondary nodes and the intranet core server.

S105, a regional firewall receives a second communication request from secondary nodes of the industrial Internet platform intranet and the intranet core server; where by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only IP and service ports of a specific host are opened, and all other accesses are prohibited.

Considering the need of centralized management and control, the regional firewall is deployed on the wide area network router, and a specific access policy is formulated according to the business situation. After the policy is formulated, only the IP and service ports of specific hosts are opened, and all other accesses are prohibited.

S106, the regional firewall judges whether the second communication request conforms to the second access policy.

S107, if the second communication request conforms to the second access policy, the regional firewall opens the IP and the service ports of the specific host and allows communication between the secondary nodes and the intranet core server.

S108, if the second communication request fails to meet the second access policy, the regional firewall prohibits the communication between the secondary nodes and the intranet core server.

In this embodiment, the method further includes: an intrusion prevention system monitors data interaction between the industrial Internet platform intranet and the Internet, access data of the Internet onto the industrial Internet platform intranet, where the intrusion prevention system is deployed in a network front-end core apparatus of the industrial Internet platform.

In this embodiment, the method further includes: a vulnerability scanning system scans each business system and security system apparatus of the industrial Internet platform, and system vulnerabilities are timely finded and measures are took timely according to scanning evaluation results; where the vulnerability scanning system is deployed in a core intranet management area. In order to prevent being invaded by hackers, it is necessary to deploy a vulnerability scanning system in the network system. Through the vulnerability scanning system, the security of the network system can be analyzed regularly, and the existing weaknesses and vulnerabilities can be found and corrected. Vulnerability scanning system is a powerful tool for administrators to monitor network communication data flow, find network vulnerabilities and solve problems. According to the network design of this system, the vulnerability scanning system is deployed in the core intranet management area, so that the vulnerability scanning system can access the system to be evaluated as unrestricted as possible. After the vulnerability scanning system is deployed, it will scan all business systems and security system apparatuses of the industrial Internet platform, and according to the scanning evaluation results, system vulnerabilities can be found in time and measures can be taken in time.

In this embodiment, the method also includes user data isolation, data access control, residual information protection, data storage and backup recovery. Where, the user data isolation is: realizing storage access isolation between virtual machines through a virtualization layer, isolating user data. The data access control is: performing authority control between a user and a virtual machine image, performing authority confirmation on mounted volume of the user, and performing access control on an object storage user object. The residual information protection is: performing complete data erasure before storage resources are redistributed to VM, and after stored user files/objects are deleted, performing complete data erasure on a corresponding storage area or marking as write-only, it can only be overwritten by new data to ensure that it will not be illegally restored. Data storage and backup recovery is: local data storage, backup and recovery can be realized by relying on centralized data storage and backup storage in computer room, and remote disaster recovery storage environment can be deployed in remote computer room to realize remote data backup.

Data storage and backup adopt following policies: a database data storage path is defined to a special disk array storage medium; data backup is performed in a manner of combining full backup and differential backup; the full backup is performed once a week and the differential backup of business data is performed once a day; backup data in different places is saved and managed.

In addition, security policies such as system login error locking and session timeout exit can be formulated; system vulnerability detection, patch upgrade update and backup/recovery test are regularly performed; unnecessary and uncommon system services and ports are closed, and more sensitive service ports are carefully opened; the system log audit function is opened, the system log report analysis and data backup are strengthened. Database vulnerabilities and patches upgrade update are regularly detected; database security audit system is deployed and the audit of database access and other operational behavior records are strengthened; a separation mechanism between personnel and authority in database system is established; the database system software, parameter policy, upgrade files and upgrade logs are regularly back up and restored. The network anti-virus gateway is deployed to realize the detection and removal of active malicious code at the network boundary, and the malicious code prevention mechanism is improved based on the existing anti-virus service, and the following security strategies for malicious code prevention are specifically realized: a monitoring policy for file system access is established, and the inspection and analysis of suspicious objects and infected objects are strengthened; a policy for dealing with suspicious objects and infected objects is established, it is realized by isolation or deletion; log records and alarm notifications of virus detection, killing, upgrading and other related events are made; the isolation period, pretreatment time and method of suspicious object program files are formulated; the anti-virus vendors' handling methods of suspicious object programs or virus codes are regularly tracked; the log management policy is improved, the log analysis and filing of virus killing and library file upgrading are strengthened.

In this embodiment, the method further includes: important servers and all security apparatuses are managed by a security management platform server, analysis is performed after logs are collected, alarm levels are separated; an alarm is gave in a manner of sound, light, electricity, mail or short message, and an administrator is reminded in time; where the security management platform server is deployed in a management area of the industrial Internet platform intranet, protection is provided by a firewall, and external Internet users are not allowed to access the security management platform server.

In addition, the method also includes security protection measures for the virtualized system, Virtualization brings benefits as well as new security risks. The first is whether the virtual layer can really isolate the virtual machine from the host safely, which is the root of ensuring the security of the virtual machine. Secondly, because the virtual machines run on the same host, if the host is damaged, all the virtual machines on it will be affected. Similarly, if the virtual network between virtual machines is damaged, these virtual machines will also be affected.

In this disclosure, most physical hardware, such as network cards and disks, cannot be contacted by virtual machines, a virtual machine monitor is responsible for simulating all physical apparatuses of the virtual machines and physically isolating virtual machine apparatus. Between the virtual machines by dividing VLAN is supported to isolate, and virtual machine security group is supported. For protection of a malicious virtual machine, a function of preventing address spoofing is realized, the virtual machines are restricted to only send message with local addresses, detection of VM port scanning and sniffing behavior is supported, memory is blocked and allocation policies are stored, and contents of a memory page are emptied when allocating memory for the virtual machines and other user-mode processes. Contents of all disk image files are emptied when deleting the virtual machines. When storage space is newly allocated for the virtual machines, contents in a corresponding disk block are emptied. Data of the virtual machines is prevented from being accessed at will, a mandatory access control security policy is used. In a physical machine, virtual machine resources are accessed only by a specific virtualization management program, and the virtual machine resources are not capable of being accessed by all other programs no matter running under any identity. Disk data of the virtual machines encrypted and stored in the physical machine. Network monitoring and address spoofing are prevented, Mac address and IP address of the virtual machines in the physical machine are bound, and the virtual machines are not capable of modifying itself IP address and Mac address, a management communication network card of the physical machines and a virtual machine share network card are respectively established, and the virtual machines are completely shielded from a network card used by the physical machine itself. In the physical machine, a perfect network access rule firewall is provided for all running virtual machines, illegal access attempts initiated by the virtual machines are effectively discovered and prevented. Network security realization among the virtual machines in virtualized network depends on virtual security module function. A virtual security function module includes a virtual module security agent function, a virtual module manager function and a virtualized security management center. A virtualized security agent module is deployed on a protected server or virtual machines. A virtualization security manager module provides centralized policy management, issues security updates and monitors through alarms and reports. A virtualization security manager center is a hosted portal and professional vulnerability research team develops rule updates for newly emerging threats through the portal, and then a security manager issues these updates regularly. In this disclosure, servers in application system domain are deployed in a same security domain, and corresponding application services are deployed on the physical machine and the virtual machines. According to security protection specification of hierarchical protection, different application services in the same security domain is further logical isolated and access controlled. The disclosure fully utilizes the access control function and intrusion detection function realized by the security control module in virtualization to meet the requirements of further subdivision and security access control of different application services in the same security application service domain, thereby realizing effective logic and access control of application services in a virtualized network through virtual security access control and monitoring capabilities among different application services. The industrial Internet platform runs in the mode of 1+1 backup. When one management node fails, the system automatically switches to the standby node to ensure the uninterrupted operation of the whole system.

Figure 3:
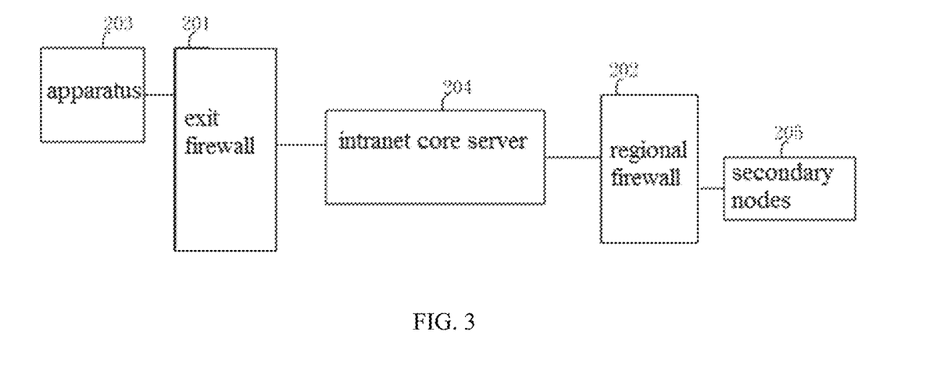
FIG. 3 is a schematic diagram of the security protection device based on industrial Internet according to the disclosure.

Referring to FIG. 3, the disclosure provides a security protection device based on industrial Internet, including:

an exit firewall 201 used for receiving a first communication request from an apparatus 203 deployed in an exit area and an intranet core server 204, where by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet; whether the first communication request conforms to the first access policy is judged; where if the first communication request conforms to the first access policy, corresponding IP and ports are opened to allow communication between the apparatus deployed in the exit area and the intranet core server; if the first communication request fails to conform to the first access policy, the communication between the apparatus deployed in the exit area and the intranet core server is prohibited.

a regional firewall 202 used for receiving a second communication request from secondary nodes 205 of the industrial Internet platform intranet and the intranet core server 204; where by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only IP and service ports of a specific host are opened, and all other accesses are prohibited; whether the second communication request conforms to the second access policy is judged; where if the second communication request conforms to the second access policy, the IP and the service ports of the specific host are opened and communication between the secondary nodes and the intranet core server is allowed; if the second communication request fails to meet the second access policy, the communication between the secondary nodes and the intranet core server is prohibited.

In this embodiment, the device further includes: an intrusion prevention system used for monitoring data interaction between the industrial Internet platform intranet and the Internet, and access data of the Internet onto the industrial Internet platform intranet, where the intrusion prevention system is deployed in a network front-end core apparatus of the industrial Internet platform.

In this embodiment, the device further includes: a vulnerability scanning system used for scanning each business system and security system apparatus of the industrial Internet platform, and timely finding system vulnerabilities and taking timely measures according to scanning evaluation results; where the vulnerability scanning system is deployed in a core intranet management area.

In this embodiment, the device further includes: a data security system used for realizing storage access isolation between virtual machines through a virtualization layer, and isolating user data; authority control is performed between a user and a virtual machine image, authority confirmation is performed on mounted volume of the user, and access control is performed on an object storage user object; complete data erasure is performed before storage resources are redistributed to VM, and after stored user files/objects are deleted, complete data erasure is performed on a corresponding storage area or is marked as write-only; where data storage and backup adopt following policies: a database data storage path is defined to a special disk array storage medium; data backup is performed in a manner of combining full backup and differential backup; the full backup is performed once a week and the differential backup of business data is performed once a day; backup data is saved and managed in different places.

In this embodiment, the device further includes: a security management platform server used for managing important servers and all security apparatuses, performing analysis after logs being collected, separating alarm levels; giving an alarm in a manner of sound, light, electricity, mail or short message, and reminding an administrator in time; where the security management platform server is deployed in a management area of the industrial Internet platform intranet, protection is provided by a firewall, and external Internet users are not allowed to access the security management platform server.

The embodiment of the disclosure also provides a storage medium, where a computer program is stored in the storage medium, and when the computer program is executed by a processor, part or all of the steps in the embodiments of the security protection method based on industrial Internet provided by the disclosure are realized. The storage medium can be a magnetic disk, an optical disk, a Read-Only Memory (ROM) or a Random Access Memory (RAM).

Those skilled in the art can clearly understand that the technology in the embodiment of the disclosure can be realized by means of software and necessary general hardware platform. Based on this understanding, the technical scheme in the embodiment of the disclosure can be embodied in the form of software products in essence or in other words, the part that contributes to the prior art, the computer software products can be stored in a storage medium, such as ROM/RAM, magnetic disk, optical disk, etc., and include several instructions to make a computer device (which can be a personal computer, a server, or a network apparatus, etc.) execute the methods described in various embodiments or some parts of the embodiments of the disclosure.

The same and similar parts between the various embodiments in this specification can only be referred to each other. Especially, for the embodiment of the security protection device based on the industrial Internet, because it is basically similar to the method embodiment, the description is relatively simple, so please refer to the description in the method embodiment for the relevant points.

The embodiments of the disclosure described above do not constitute a limitation on the protection scope of the disclosure.

What is claimed is:

1. A security protection method based on industrial Internet, comprising:

receiving a first communication request from an apparatus deployed in an exit area and an intranet core server through an exit firewall; wherein by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet;

judging whether the first communication request conforms to the first access policy through the exit firewall;

wherein if the first communication request conforms to the first access policy, the exit firewall opens corresponding Internet Protocol and ports to allow communication between the apparatus deployed in the exit area and the intranet core server;

if the first communication request fails to conform to the first access policy, the exit firewall fails to open corresponding Internet Protocol and ports to allow the communication between the apparatus deployed in the exit area and the intranet core server;

receiving a second communication request from secondary nodes of the industrial Internet platform intranet and the intranet core server through a regional firewall; wherein by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only Internet Protocol and service ports of a specific host are opened, and all other accesses are prohibited;

judging whether the second communication request conforms to the second access policy through the regional firewall;

wherein if the second communication request conforms to the second access policy, the regional firewall opens the Internet Protocol and the service ports of the specific host to allow communication between the secondary nodes and the intranet core server;

if the second communication request fails to conform the second access policy, the regional firewall fails to open the Internet Protocol and the service ports of the specific host to allow the communication between the secondary nodes and the intranet core server;

wherein the method further comprises:

realizing storage access isolation between virtual machines through a virtualization layer, isolating user data;

performing authority control between a user and a virtual machine image, performing authority confirmation on mounted volume of the user, and performing access control on an object storage user object;

performing complete data erasure before storage resources being redistributed to Virtual Machine, and after stored user files/objects are deleted, performing complete data erasure on a corresponding storage area or marking as write-only;

wherein data storage and backup adopt following policies: defining a database data storage path to a special disk array storage medium; performing data backup in a manner of combining full backup and differential backup; performing the full backup once a week and performing the differential backup of business data once a day; saving and managing backup data in different places;

responsibly simulating all physical apparatuses of the virtual machines through a virtual machine monitor and physically isolating virtual machine apparatus; supporting to isolate between the virtual machines by dividing VLAN, and supporting virtual machine security group; for protection of a malicious virtual machine, realizing a function of preventing address spoofing, restricting the virtual machines to only send message with local addresses, supporting detection of Virtual Machine port scanning and sniffing behavior, blocking memory and storing allocation policies, and emptying contents of a memory page when allocating memory for the virtual machines and other user-mode processes; emptying contents of all disk image files when deleting the virtual machines; when storage space is newly allocated for the virtual machines, emptying contents in a corresponding disk block; preventing data of the virtual machines from being accessed at will, using a mandatory access control security policy; in a physical machine, accessing virtual machine resources only by a specific virtualization management program, and not capable of accessing the virtual machine resources by all other programs no matter running under any identity; encrypting and storing disk data of the virtual machines in the physical machine; preventing network monitoring and address spoofing, binding Mac address and IP Internet Protocol address of the virtual machines in the physical machine, and not capable of modifying itself Internet Protocol address and Mac address by the virtual machines, respectively establishing a management communication network card of the physical machines and a virtual machine share network card, and completely shielding the virtual machines from a network card used by the physical machine itself; in the physical machine, providing a perfect network access rule firewall for all running virtual machines, effectively discovering and preventing illegal access attempts initiated by the virtual machines; wherein network security realization among the virtual machines in virtualized network depends on virtual security module function; wherein a virtual security function module comprises a virtual module security agent function, a virtual module manager function and a virtualized security management center; wherein a virtualized security agent module is deployed on a protected server or virtual machines; a virtualization security manager module provides centralized policy management, issues security updates and monitors through alarms and reports; a virtualization security manager center is a hosted portal and develops rule updates for newly emerging threats through the portal, and then a security manager issues these updates regularly; servers in application system domain are deployed in a same security domain, and corresponding application services are deployed on the physical machine and the virtual machines; according to security protection specification of hierarchical protection, further logical isolating and access controlling are performed on different application services in the same security domain.

2. The security protection method based on industrial Internet according to claim 1, wherein the method further comprises: monitoring data interaction between the industrial Internet platform intranet and the Internet by an intrusion prevention system, and access data of the Internet onto the industrial Internet platform intranet, wherein the intrusion prevention system is deployed in a network front-end core apparatus of the industrial Internet platform.

3. The security protection method based on industrial Internet according to claim 1, wherein the method further comprises: scanning each business system and security system apparatus of the industrial Internet platform by a vulnerability scanning system, and timely finding system vulnerabilities and taking timely measures according to scanning evaluation results; wherein the vulnerability scanning system is deployed in a core intranet management area.

4. The security protection method based on industrial Internet according to claim 1, wherein the method further comprises: managing important servers and all security apparatuses by a security management platform server, and performing analysis after logs being collected, separating alarm levels; giving an alarm in a manner of sound, light, electricity, mail or short message, and reminding an administrator in time; wherein the security management platform server is deployed in a management area of the industrial Internet platform intranet, protection is provided by a firewall, and external Internet users are not allowed to access the security management platform server.

5. The security protection device based on industrial Internet, wherein the device comprises:
an exit firewall used for receiving a first communication request from an apparatus deployed in an exit area and an intranet core server, wherein by deploying the exit firewall, isolation between Internet and an industrial internet platform intranet is realized; a first access policy between the Internet and the industrial Internet platform intranet divided by the exit firewall is: the industrial Internet platform intranet has no restriction onto the Internet, and only necessary ports are opened from the Internet to the industrial Internet platform intranet; whether the first communication request conforms to the first access policy is judged; wherein if the first communication request conforms to the first access policy, corresponding Internet Protocol and ports are opened to allow communication between the apparatus deployed in the exit area and the intranet core server; if the first communication request fails to conform to the first access policy, corresponding Internet Protocol and ports are not opened to allow the communication between the apparatus deployed in the exit area and the intranet core server;
a regional firewall used for receiving a second communication request from secondary nodes of the industrial Internet platform intranet and the intranet core server; wherein by deploying the regional firewall, isolation between the intranet core server and each of the secondary nodes is realized; the regional firewall is deployed on a wide area network router, and a second access policy of the secondary nodes and the intranet core server is preset, after formulation of the second access policy is completed only Internet Protocol and service ports of a specific host are opened, and all other accesses are prohibited; whether the second communication request conforms to the second access policy is judged; wherein if the second communication request conforms to the second access policy, the IP-Internet Protocol and the service ports of the specific host are opened and communication between the secondary nodes and the intranet core server is allowed; if the second communication request fails to conform the second access policy, the Internet Protocol and the service ports of the specific host are not opened and communication between the secondary nodes and the intranet core server is not allowed;
the device further comprises:
a data security system used for realizing storage access isolation between virtual machines through a virtualization layer, and isolating user data; wherein authority control is performed between a user and a virtual machine image, authority confirmation is performed on mounted volume of the user, and access control is performed on an object storage user object; complete data erasure is performed before storage resources being redistributed to Virtual Machine, and after stored user files/objects are deleted, complete data erasure is performed on a corresponding storage area or is marked as write-only; wherein data storage and backup adopt following policies: a database data storage path is defined to a special disk array storage medium; data backup is performed in a manner of combining full backup and differential backup; the full backup is performed once a week and the differential backup of business data is performed once a day; backup data is saved and managed in different places;
a virtual machine monitor is responsible for simulating all physical apparatuses of the virtual machines and physically isolating virtual machine apparatus; between the virtual machines by dividing VLAN is supported to isolate, and virtual machine security group is supported; for protection of a malicious virtual machine, a function of preventing address spoofing is realized, the virtual machines are restricted to only send message with local addresses, detection of Virtual Machine port scanning and sniffing behavior is supported, memory is blocked and allocation policies are stored, and contents of a memory page are emptied when allocating memory for the virtual machines and other user-mode processes; contents of all disk image files are emptied when deleting the virtual machines; when storage space is newly allocated for the virtual machines, contents in a corresponding disk block are emptied; data of the virtual machines is prevented from being accessed at will, a mandatory access control security policy is used; in a physical machine, virtual machine resources are accessed only by a specific virtualization management program, and the virtual machine resources are not capable of being accessed by all other programs no matter running under any identity; disk data of the virtual machines encrypted and stored in the physical machine; network monitoring and address spoofing are prevented, Mac address and Internet Protocol address of the virtual machines in the physical machine are bound, and the virtual machines are not capable of modifying itself Internet Protocol address and Mac address, a management communication network card of the physical machines and a virtual machine share network card are respectively established, and the virtual machines are completely shielded from a network card used by the physical machine itself; in the physical machine, a perfect network access rule firewall is provided for all running virtual machines, illegal access attempts initiated by the virtual machines are effectively discovered and prevented; wherein network security realization among the virtual machines in virtualized network depends on virtual security module function; wherein a virtual security function module comprises a virtual module security agent function, a virtual module manager function and a virtualized security management center; a virtualized security agent module is deployed on a protected server or virtual machines; a virtualization security manager module provides centralized policy management, issues security updates and monitors through alarms and reports; a virtualization security manager center is a hosted portal and develops rule updates for newly emerging threats through the portal, and then a security manager issues these updates regularly; servers in application system domain are deployed in a same security domain, and corresponding application services are deployed on the physical machine and the virtual machines; according to security protection specification of hierarchical protection, different application services in the same security domain is further logical isolated and access controlled.

6. The security protection device based on industrial Internet according to claim 5, wherein the device further comprises an intrusion prevention system used for monitoring data interaction between the industrial Internet platform intranet and the Internet, and access data of the Internet onto the industrial Internet platform intranet, wherein the intrusion prevention system is deployed in a network front-end core apparatus of the industrial Internet platform.

7. The security protection device based on industrial Internet according to claim 5, wherein the device further comprises a vulnerability scanning system used for scanning each business system and security system apparatus of the industrial Internet platform, and timely finding system vulnerabilities and taking timely measures according to scanning evaluation results; wherein the vulnerability scanning system is deployed in a core intranet management area.

8. The security protection device based on industrial Internet according to claim 5, wherein the device further comprises a security management platform server used for managing important servers and all security apparatuses, performing analysis after logs being collected, separating alarm levels; giving an alarm in a manner of sound, light, electricity, mail or short message, and reminding an administrator in time; wherein the security management platform server is deployed in a management area of the industrial Internet platform intranet, protection is provided by a firewall, and external Internet users are not allowed to access the security management platform server.

* * * * *